(12) United States Patent
Hartenstine et al.

(10) Patent No.: US 9,481,271 B2
(45) Date of Patent: Nov. 1, 2016

(54) CHILD SEAT

(75) Inventors: Curtis M. Hartenstine, Birdsboro, PA (US); Michael H. Gillett, Stowe, OH (US); Sharon A. Gillett, Stowe, OH (US)

(73) Assignee: Wonderland Nurserygoods Company Limited (HK)

( * ) Notice: Subject to any disclaimer, the term of this patent is extended or adjusted under 35 U.S.C. 154(b) by 461 days.

(21) Appl. No.: 13/535,437

(22) Filed: Jun. 28, 2012

(65) Prior Publication Data

US 2013/0001992 A1    Jan. 3, 2013

Related U.S. Application Data

(60) Provisional application No. 61/571,637, filed on Jul. 1, 2011.

(51) Int. Cl.
*B60N 2/28* (2006.01)
*B60N 3/10* (2006.01)

(52) U.S. Cl.
CPC ........... *B60N 2/2866* (2013.01); *B60N 2/2887* (2013.01); *B60N 3/101* (2013.01)

(58) Field of Classification Search
USPC ........................................................ 297/253
See application file for complete search history.

(56) References Cited

U.S. PATENT DOCUMENTS

| | | | |
|---|---|---|---|
| 3,709,558 A | 1/1973 | Jakob | |
| 4,632,460 A | 12/1986 | Meeker et al. | |
| 4,913,490 A | 4/1990 | Takahashi et al. | |
| 5,118,163 A | 6/1992 | Brittian et al. | |
| 5,383,708 A * | 1/1995 | Nagasaka et al. | 297/250.1 |
| 5,458,393 A | 10/1995 | Benedyk | |
| 5,695,243 A | 12/1997 | Anthony et al. | |
| 5,957,531 A | 9/1999 | Kane et al. | |
| 6,824,222 B2 * | 11/2004 | Maloney | B60R 22/1855 297/478 |
| 6,908,100 B2 | 6/2005 | Kassai et al. | |
| 7,246,854 B2 * | 7/2007 | Dingman et al. | 297/250.1 |
| 7,445,230 B2 | 11/2008 | Kassai et al. | |
| 7,597,396 B2 * | 10/2009 | Longenecker et al. | 297/253 |
| 8,056,975 B2 | 11/2011 | Longenecker et al. | |
| 8,141,950 B2 * | 3/2012 | Boyer | 297/250.1 |
| 8,690,188 B2 * | 4/2014 | Fiore | 280/733 |
| 8,789,886 B2 * | 7/2014 | Mason et al. | 297/253 |
| 2001/0015572 A1 * | 8/2001 | Miller | 297/467 |
| 2002/0113470 A1 | 8/2002 | Kain | |

(Continued)

FOREIGN PATENT DOCUMENTS

| | | |
|---|---|---|
| CN | 19935254367 A | 10/1993 |
| CN | 201012900 A | 1/2010 |

(Continued)

*Primary Examiner* — David E Allred
(74) *Attorney, Agent, or Firm* — Baker & McKenzie LLP; David I. Roche

(57) ABSTRACT

A child seat includes a seat shell, a retractor assembly connected with the seat shell, two anchor strap portions extending outward from a rear of the seat shell, and an adjustment strap extending outside the seat shell. Each of the two anchor straps is provided with a fastener operable to attach with an anchor structure of a vehicle. The two anchor strap portions extend outward from a rear of the seat shell, and are provided with two fasteners operable to attach with an anchor structure of a vehicle, the anchor strap portions being connected with the retractor assembly. The adjustment strap is operable to actuate the retractor assembly to retract the anchor strap portions toward an interior of the seat shell.

9 Claims, 11 Drawing Sheets

(56) References Cited

U.S. PATENT DOCUMENTS

| | | | |
|---|---|---|---|
| 2003/0030311 A1* | 2/2003 | Woodard et al. | 297/250.1 |
| 2003/0047972 A1* | 3/2003 | Burleigh et al. | 297/216.11 |
| 2004/0084938 A1* | 5/2004 | Tomas et al. | 297/250.1 |
| 2010/0033001 A1* | 2/2010 | Boyer | 297/253 |
| 2011/0109138 A1 | 5/2011 | Inoue et al. | |
| 2012/0247239 A1* | 10/2012 | Hortig | B65G 1/0407 74/89.22 |
| 2012/0261958 A1* | 10/2012 | Hutchinson et al. | 297/250.1 |
| 2013/0119732 A1 | 5/2013 | Werstl | |
| 2013/0127218 A1* | 5/2013 | Carpenter | B60N 2/2821 297/253 |

FOREIGN PATENT DOCUMENTS

| | | |
|---|---|---|
| DE | 202010008803 U1 | 2/2011 |
| EP | 1078809 A1 | 2/2001 |
| EP | 2233348 A1 | 9/2010 |
| FR | 2883813 | 10/2006 |
| JP | 19935254367 A | 10/1993 |
| JP | 201012900 A | 1/2010 |
| TW | 587032 | 5/2004 |
| TW | 593015 | 6/2004 |
| TW | I220891 | 9/2004 |

* cited by examiner

CHILD SEAT

CROSS-REFERENCE TO RELATED APPLICATION

This patent application claims priority to U.S. Provisional Patent Application No. 61/571,637 filed on Jul. 1, 2011.

BACKGROUND

1. Field of the Invention

The present inventions relate to child seats.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. As a result, safety legislations require the use of a child safety seat for seating a young child in a vehicle. The seatbelt of the vehicle can be used to secure the child safety seat, which is more adapted to provide protection for the young child.

However, the installation of the child safety seat with the seatbelt of the vehicle may be cumbersome to achieve, and improper installation may occur. To facilitate the installation of the child safety seat, certain seat designs may provide an internal harness that can securely anchor with the vehicle seat without the need of using the passenger seatbelt of the vehicle. However, the use of the internal harness is usually limited to child safety seats of complex structures. There is a need for a design of a regular child seat (such as booster seat) that can have some harness structure simple in construction, and easy to operate.

SUMMARY

The present application describes a child seat that includes a seat shell, a retractor assembly connected with the seat shell, two anchor strap portions extending outward from a rear of the seat shell, and an adjustment part accessible from an outside of the seat shell. Each of the two anchor straps is provided with a fastener operable to attach with an anchor structure of a vehicle. The two anchor strap portions extend outward from a rear of the seat shell, and are provided with two fasteners operable to attach with an anchor structure of a vehicle, the anchor strap portions being connected with the retractor assembly. The adjustment part is operable to actuate the retractor assembly to retract the anchor strap portions toward an interior of the seat shell.

DETAILED DESCRIPTION OF THE EMBODIMENTS

Figure 1:
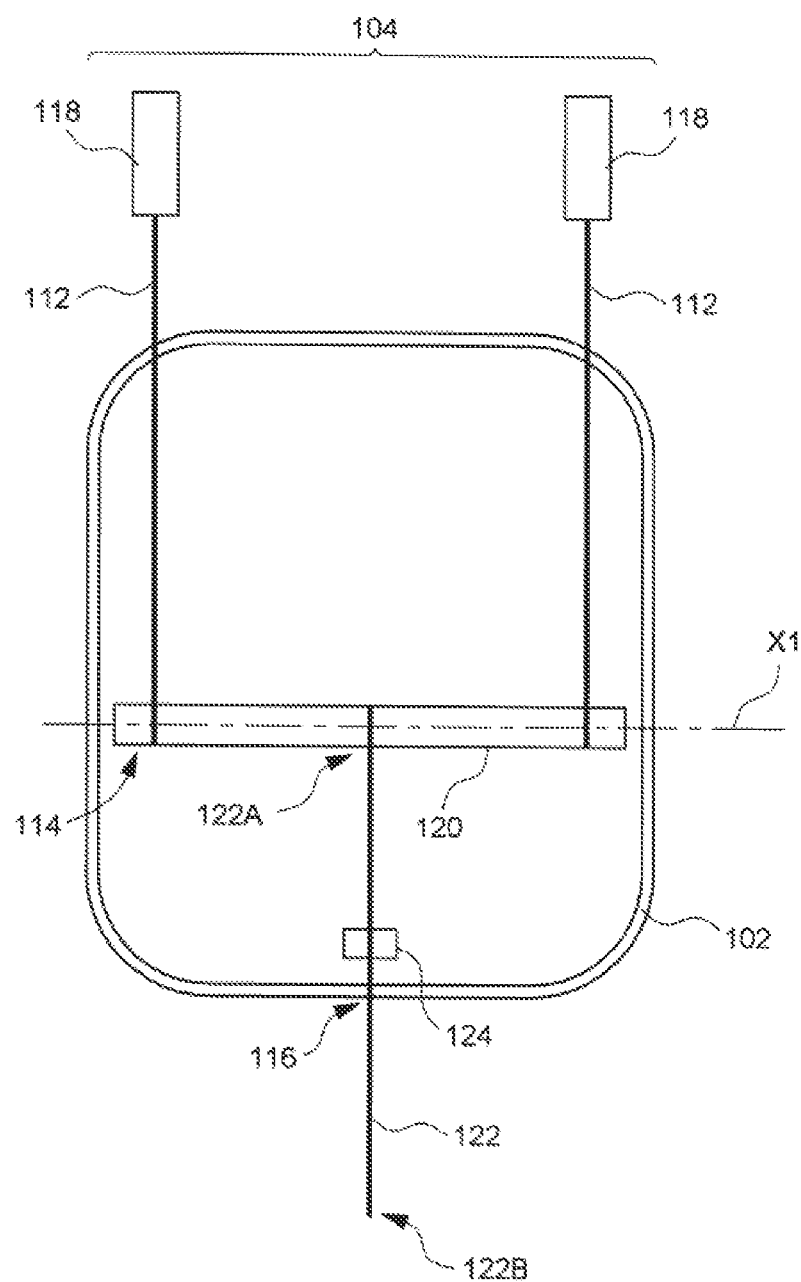
FIG. 1 is a schematic planar view illustrating an embodiment of a child seat.
Figure 2:
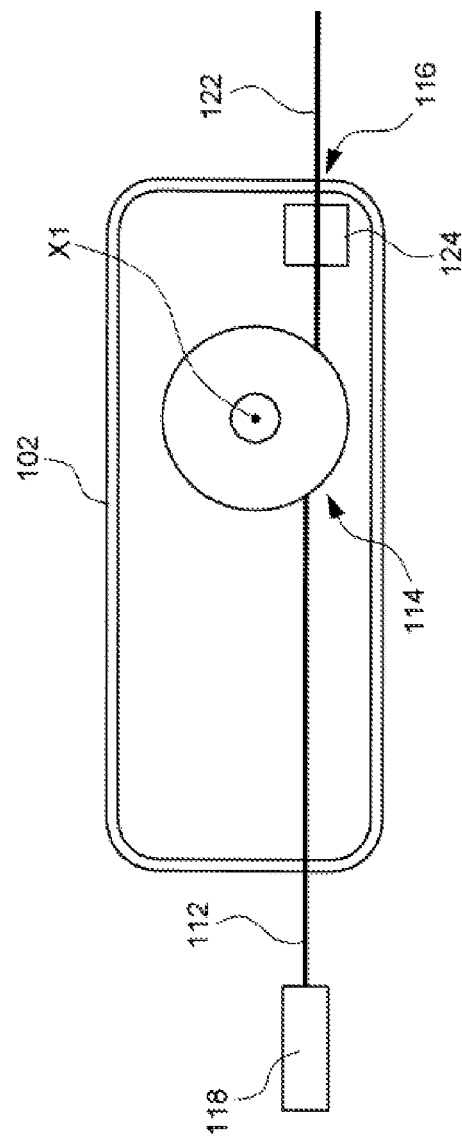
FIG. 2 is a schematic side view of the child seat shown in FIG. 1.

FIG. 1 is a schematic planar view illustrating an embodiment of a child seat 100, and FIG. 2 is a schematic side view of the child seat 100. The child seat 100 can exemplary be a booster seat. The child seat 100 can include a seat shell 102, and a restraint system 104 operable to attach the child seat 100 with an anchor structure provided in a vehicle. In one embodiment, the seat shell 102 can be formed by plastic molding, and have a hollow interior through which the restraint system 104 can be assembled.

The restraint system 104 can include two anchor strap portions 112, a retractor assembly 114 and an adjustment part 116. Each of the anchor strap portions 112 can be respectively made of a separate web material. Each anchor strap portion 112 can have a first end connected with a fastener 118, and a second end connected with the retractor assembly 114.

The retractor assembly 114 can be operable to retract the anchor strap portions 112 toward an interior of the seat shell 102. In the embodiment shown in FIGS. 1 and 2, the retractor assembly 114 can exemplary include a spool 120 that is pivotally assembled with the seat shell 102. The spool 120 and its pivot axis X1 can extend transversally relative to the seat shell 102. The spool 120 can have two opposite end portions respectively connected with the two anchor strap portions 112. The spool 120 can rotate in either of two opposite directions to either wind and unwind at least partially the anchor strap portions 112.

The adjustment part 116 can be operable to drive rotation of the spool 120 in a direction that at least partially winds the anchor strap portions 112 around the spool 120. In one embodiment, the adjustment part 116 can include an adjustment strap 122 and a lock 124. The adjustment strap 122 can be made from a web material distinct and separate from the anchor strap portions 112. The adjustment strap 122 can have a first end portion 122A and a second end portion 122B. The first end portion 122A can be connected with a region of the spool 120 that is located between the connections of the two anchor strap portions 112 with the spool 120, and pass through the clamping lock 124 disposed near a front of the seat shell 102. The second end portion 122B can extend outward at the front of the seat shell 102.

Figure 3:
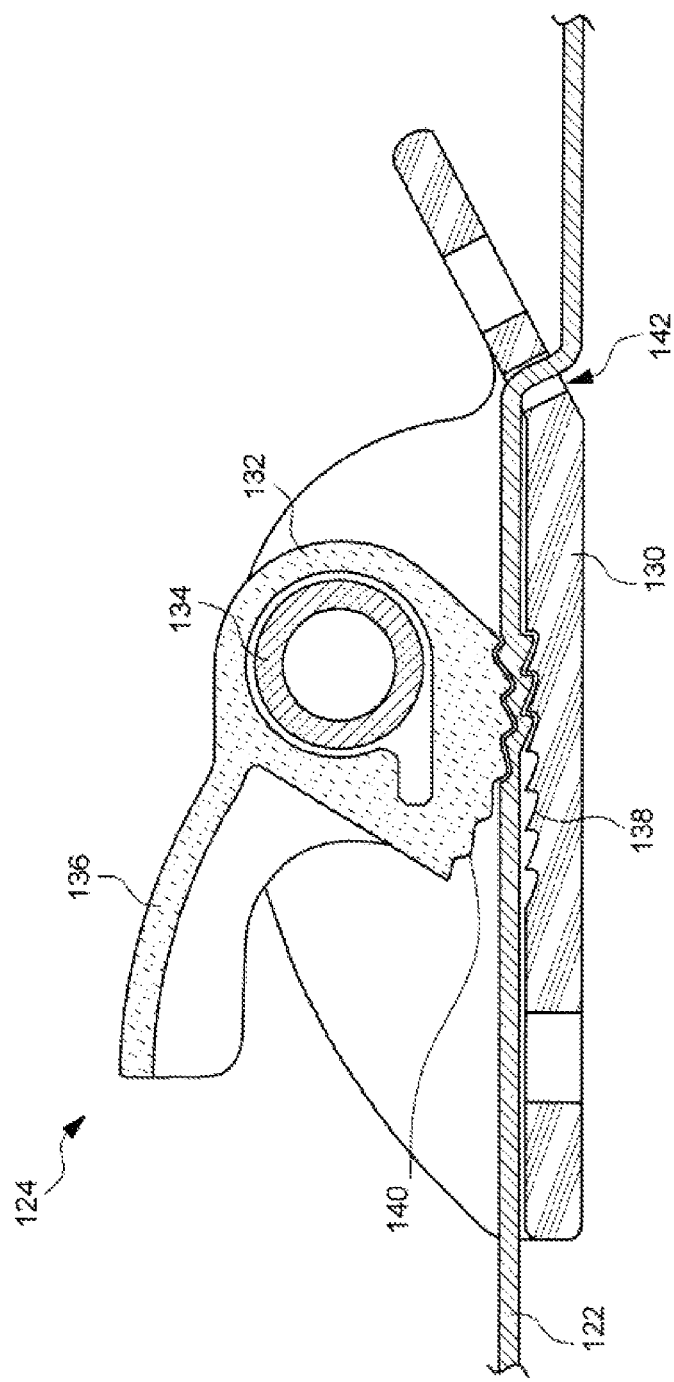
FIG. 3 is a schematic view illustrating an example of construction for a lock used in the child seat.

FIG. 3 is a schematic view illustrating an example of construction for the lock 124. The lock 124 can be exemplary formed as clamping device including a base 130, clamping part 132, a spring 134 and a release actuating portion 136. The base 130 can be affixed with the seat shell 102. An inner surface of the base 130 can include a plurality of teeth 138. The clamping part 132 can be pivotally mounted with the base 130 at a position adjacent to the teeth 138. Moreover, the clamping part 132 can have an edge portion provided with a plurality of protruding teeth 140. The adjustment strap 122 can sequentially travel through an opening 142 of the base 130, pass between the base 130 and the clamping part 132, and extend away from the lock 124 at a side opposite to the opening 142. The spring 134 can be a torsion spring assembled between the clamping part 132 and the base 130, or between the clamping part 132 and the seat shell 102. The spring 134 can be operable to bias the clamping part 132 to a locking state in which the teeth 140 of the clamping part 132 substantially face the teeth 138 of the base 130 to clamp the adjustment strap 122. The release actuating portion 136 can connected with the clamping part 132 at a location eccentric from the pivot axis of the clamping part 132, and exposed outward from the seat shell 102 for operation. In one embodiment, the release actuating portion 136 and the clamping part 132 can be formed integrally in a unitary piece. The release actuating portion 136 can be operable to rotate the clamping part 132 so that the teeth 140 of the clamping part 132 are misaligned from the teeth 138 of the base 130. The lock 124 can be thereby turned to an unlocking state allowing sliding movement of the adjustment strap 122 through the lock 124 to actuate the retractor assembly 114 to retract the anchor strap portions 112 toward an interior of the seat shell 102.

When the child seat 100 is to be installed on a vehicle seat, the lock 124 can be turned to a release state to unclamp the adjustment strap 122. The anchor strap portions 112 then can be pulled outward to increase the length of the anchor strap portions 112 at the rear of the seat shell 102. As a result, the spool 120 of the retractor assembly 114 can rotate to unwind at least partially the anchor strap portions 112, while more of the adjustment strap 122 can become wrapped around the spool 120. With a greater length of the anchor strap portions 112 extending outward from the rear of the seat shell 102, the engagement of the fasteners 118 with the anchor structure of the vehicle can be facilitated. Once the fasteners 118 are attached with the anchor structure of the vehicle, the adjustment strap 122 then can be pulled to actuate the retractor assembly 114. As a result, the spool 120 can rotate in a direction to at least partially wind and retract the anchor strap portions 112 toward the interior of the seat shell 102. The lock 124 then can be turned to a locking state to clamp and prevent sliding of the adjustment strap 122 through the lock 124. The anchor strap portions 112 can be thereby tensioned to firmly hold the seat shell 102 in place.

When the child seat 100 is to be removed from the vehicle seat, the lock 124 can be turned to the release state to unclamp the adjustment strap 122, and the seat shell 102 can be pulled away from the anchor structure of the vehicle. As a result, the spool 120 can rotate in a direction that unwinds the anchor strap portions 112, which increases the length of the anchor strap portions 112 at the rear of the seat shell 102 to facilitate disengagement of the fasteners 118 from the anchor structure of the vehicle.

Figure 4:
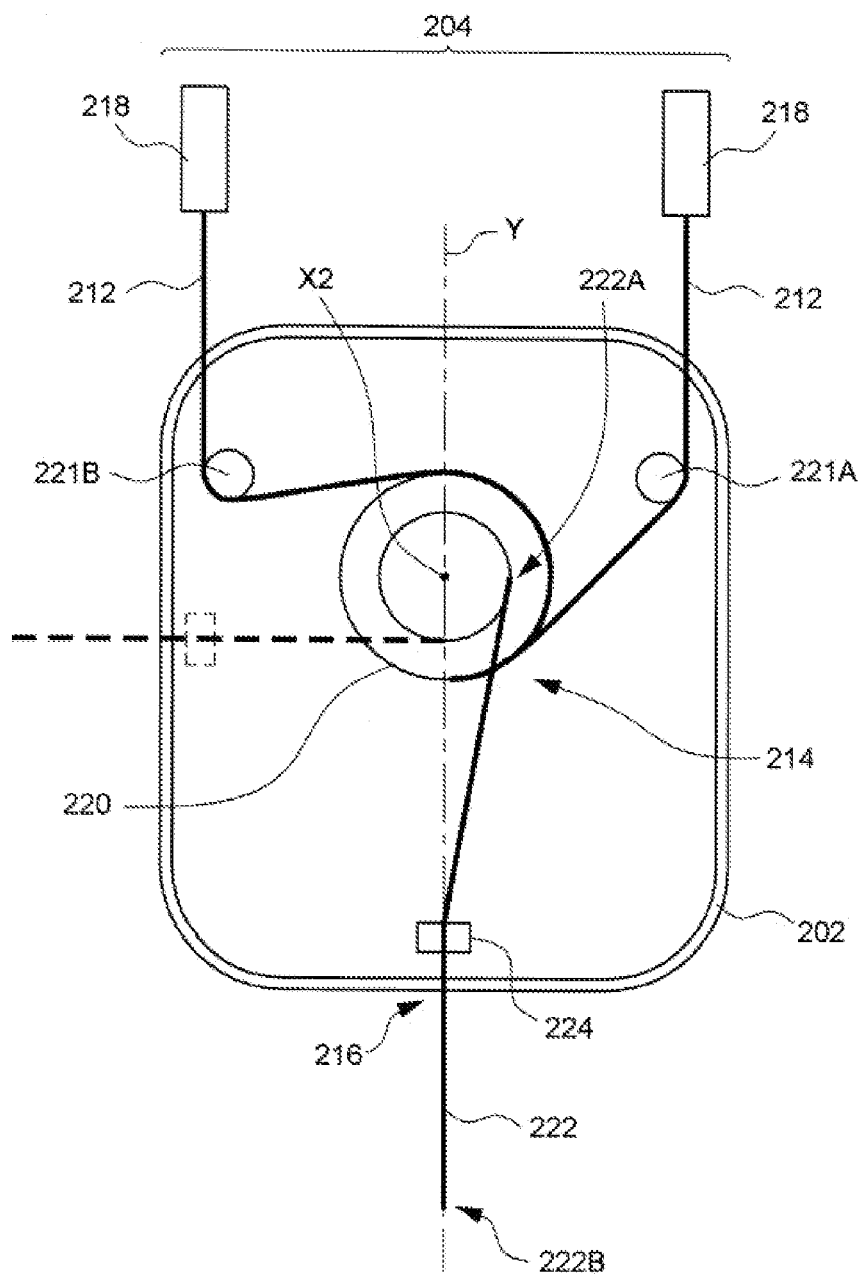
FIG. 4 is a schematic planar view illustrating another embodiment of a child seat.
Figure 5:
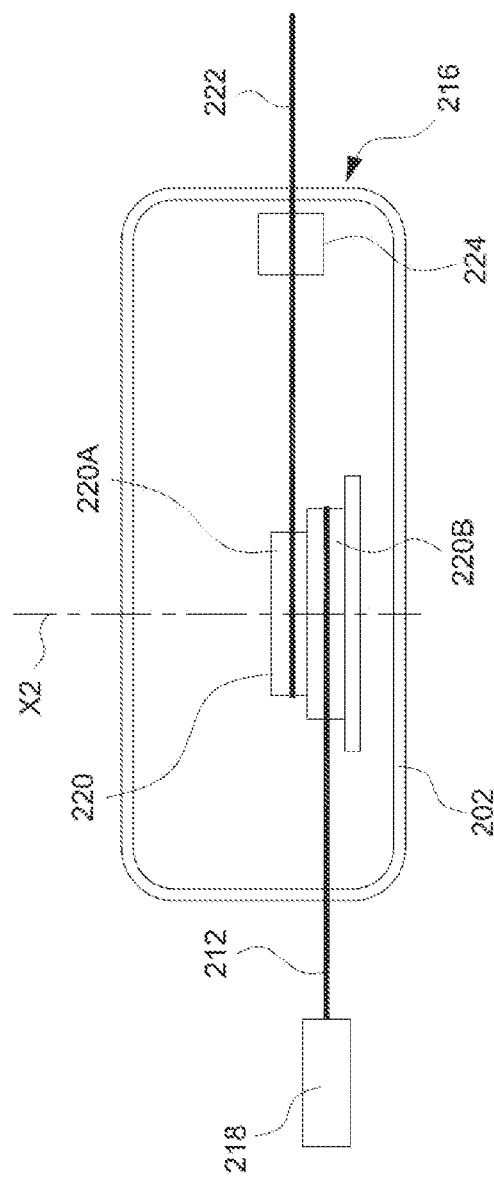
FIG. 5 is a schematic side view illustrating the child seat shown in FIG. 4.

FIG. 4 is schematic planar view illustrating another embodiment of a child seat 200, and FIG. 5 is a schematic side view of the child seat 200. Like previously described, the child seat 200 can include a seat shell 202, and a restraint system 204 operable to attach the child seat 200 with an anchor structure provided in a vehicle. In one embodiment, the seat shell 202 can be formed by plastic molding, and have a hollow interior through which the restraint system 204 can be assembled.

The restraint system 204 can include two anchor strap portions 212, a retractor assembly 214, and an adjustment part 216. Each of the anchor strap portions 212 can be respectively made of a separate continuous web material. Each anchor strap portion 212 can have a first end portion respectively connected with a fastener 218, and a second end portion respectively connected with the retractor assembly 214.

The retractor assembly 214 can include a spool 220 that is pivotally assembled with the seat shell 202. The spool 220 and its pivot axis X2 can extend along a vertical direction relative to the seat shell 202. In one embodiment, the spool 220 can be disposed adjacent to a central longitudinal axis Y of the seat shell 202. The spool 220 can be connected with the two anchor strap portions 212. The spool 220 can rotate in either of two opposite directions to either wind and unwind the anchor strap portions 212. Two guiding structures 221A and 221B may be provided at left and right sides of the spool 220. The guiding structures 221A and 221B can exemplary be posts, pulleys, and the like. The anchor strap portions 212 can respectively turn about the guiding structures 221A and 221B extend along a transversal direction of the seat shell 202, and connect with the spool 220.

The adjustment part 216 can be operable to drive rotation of the spool 220 in a direction that winds the anchor strap portions 212 around the spool 220. In one embodiment, the adjustment part 216 can include an adjustment strap 222 and a lock 224. The adjustment strap 222 can be made from a web material distinct and separate from the anchor strap portions 212. The adjustment strap 222 can have a first end portion 222A connected with a region 220A of the spool 220, pass through the lock 224 disposed near a front of the seat shell 202, and have a second end portion 222B extending outward at the front of the seat shell 202. The region 220A where the spool 220 is connected with the adjustment strap 222 can be vertically above (as shown) or below (not shown) the portion 220B of the spool 220 where is connected the anchor strap portions 212.

In alternate embodiments, the lock 224 can also be disposed near one of the left and right sides of the seat shell 202, so that the second end portion 222B of the adjustment strap 222 can pass through the lock 224 and extend outward at a lateral side of the seat shell 202 (e.g., left side as shown with phantom lines in FIG. 4).

The operations for installing and removing the child seat 200 can be similar to those of the child seat 100 described previously.

Figure 6:
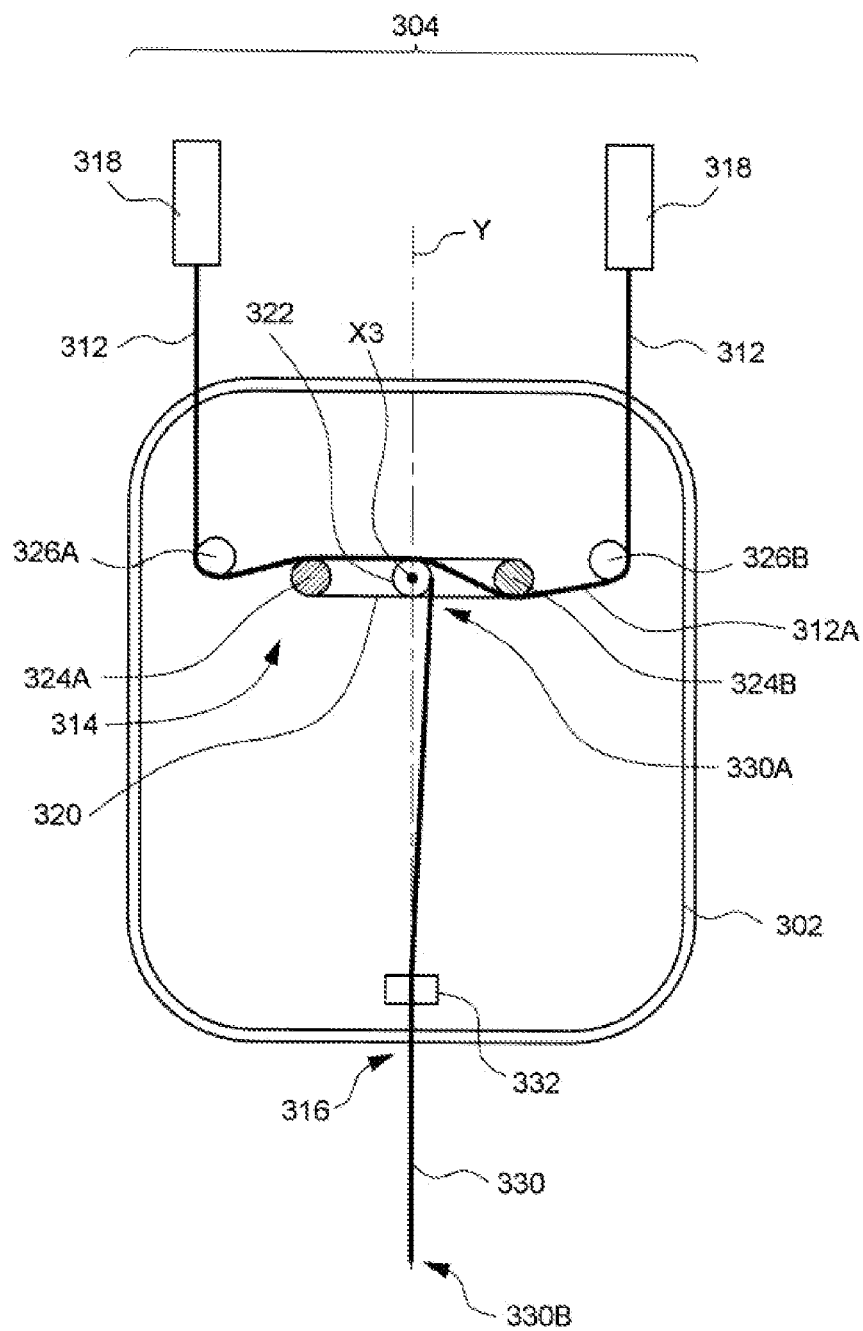
FIGS. 6 and 7 are schematic planar views illustrating another child seat.
Figure 7:
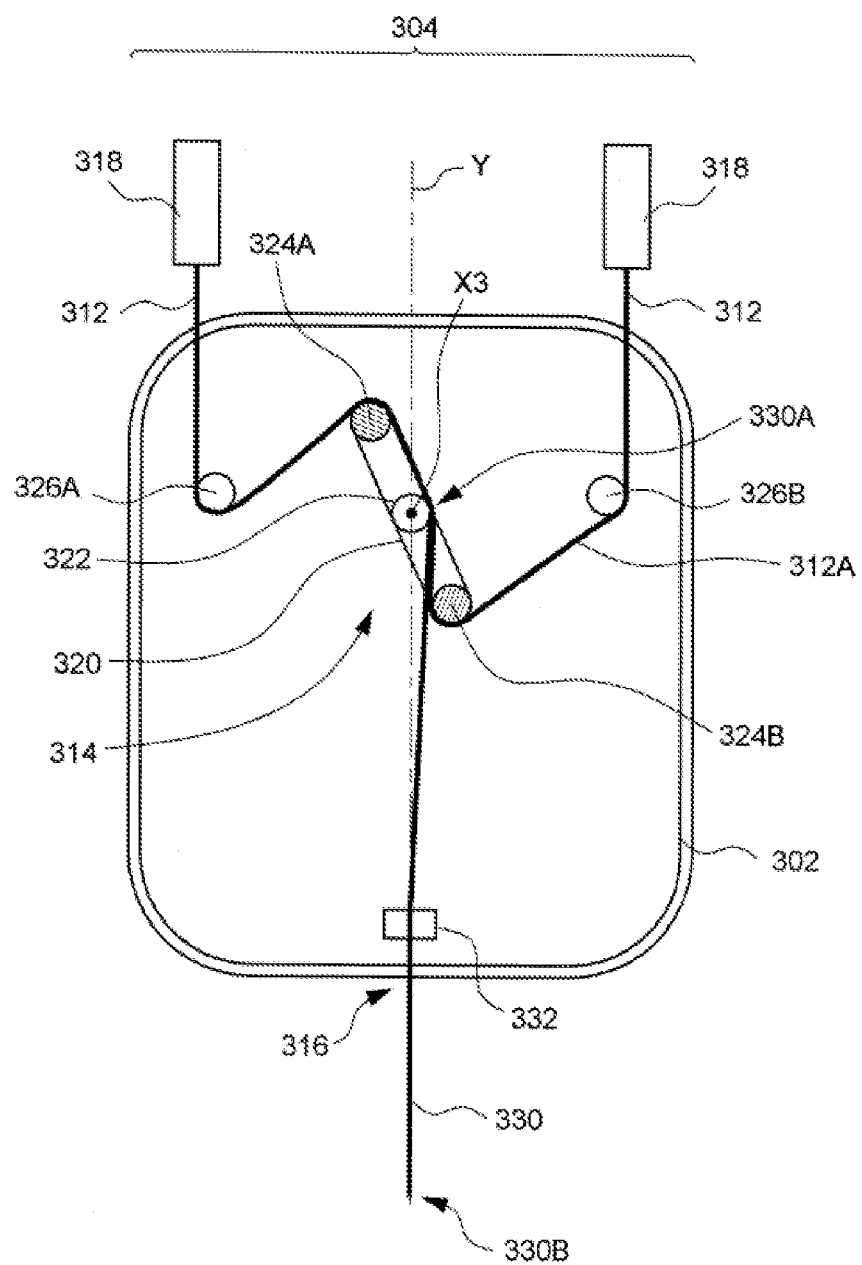

FIGS. 6 and 7 are schematic planar views illustrating the construction of another child seat 300. The child seat 300 can include a seat shell 302, and a restraint system 304 operable to attach the child seat 300 with an anchor structure provided in a vehicle. The seat shell 302 can be formed by plastic molding, and have a hollow interior through which the restraint system 304 can be assembled.

The restraint system 304 can include two anchor strap portions 312, a retractor assembly 314 and an adjustment part 316. In one embodiment, a single continuous web material 312A may be used to define the two anchor strap portions 312 extending outward from the rear of the seat shell 302. Each of the anchor strap portions 312 may be provided with a fastener 318 adapted to attach with an anchor structure of a vehicle.

The retractor assembly 314 can include a lever 320 that is pivotally connected with the seat shell 302 about a pivot axis X3 extending vertically. The lever 320 can have an elongated shape having a central post 322 parallel to the pivot axis X3, and two eccentric posts 324A and 324B spaced apart at two opposite sides of the central post 322. In one embodiment, the lever 320 may be disposed such that the central post 322 is substantially adjacent to the central longitudinal axis Y of the seat shell 302. Two guiding structures 326A and 326B may be provided at left and right sides of the lever 320. The placement of the guiding structures 326A and 326B can be such that the requisite actuating force is not increased when the eccentric posts 324A and 324B are disposed excessively apart from each other. In alternate embodiments, the guiding structures 326A and 326B may also be omitted. The two anchor strap portions 312 can extend outward, and can be connected with each other inside the seat shell 302. The web material 312A can have a first portion extending rearward to define a first one of the two anchor strap portions 312, turn around one guide structure 326A, extend along a transversal direction in contact with the eccentric post 324A and the central post 322 at one side of the lever 320, travel through a gap between the posts 322 and 324B, wrap around the post 324B at the other side of the lever 320, turn around the other guide structure 326B, and then extend rearward to define the second one of the two anchor strap portions 312.

The adjustment part 316 can be operable to drive rotation of the lever 320 in a direction that retracts the anchor strap portions 312 toward an interior of the seat shell 302. In one embodiment, the adjustment part 316 can include an adjustment strap 330 and a lock 332. The adjustment strap 330 can be made from a web material distinct and separate from the anchor strap portions 312. The adjustment strap 330 can have a first end portion 330A connected with the lever 320, pass through the lock 332 disposed near a front of the seat shell 302, and have a second end portion 330B extending outward at the front of the seat shell 302. For retracting the anchor strap portions 312, the adjustment strap 330 can be operable to drive rotation of the lever 320 in a direction that causes the eccentric posts 324A and 324B to push on the web material 312A, and respectively increases a first distance between the guide structure 326A and the post 324A and a second distance between the guide structure 326B and the post 324B.

When the child seat 300 is to be installed on a vehicle seat, the lock 332 can be turned to a release state to unclamp the adjustment strap 330, and the anchor strap portions 312 can be pulled outward to increase the length of the anchor strap portions 312 at the rear of the seat shell 302. When the anchor strap portions 312 reach the maximum length of extension, the segments of the anchor strap portions 312 that are located between the guide structures 326A and 326B are approximately parallel to the line passing by the guide structures 326A and 326B, and approximately perpendicular to the central longitudinal axis Y of the seat shell 302. Once the fasteners 318 are attached with the anchor structure of the vehicle, the adjustment strap 330 can be pulled to drive rotation of the lever 320 in a direction for retracting and tensioning the anchor strap portions 312. As shown in FIG. 7, this rotation of the lever 320 causes the eccentric posts 324A and 324B to push on the web material 312A, and respectively increases the first distance between the guide structure 326A and the post 324A and the second distance between the guide structure 326B and the post 324B. After the anchor strap portions 312 are suitably tensioned, the lock 332 can be turned to a locking state to clamp and prevent sliding of the adjustment strap 330 through the lock 332.

When the child seat 300 is to be removed from the vehicle seat, the lock 332 can be turned to the release state, and the seat shell 302 can be pulled away from the anchor structure of the vehicle. As a result, the lever 320 can rotate in a reverse direction, and the length of the anchor strap portions 312 can be increased at the rear of the seat shell 302 to facilitate disengagement of the fasteners 318 from the anchor structure of the vehicle.

Figure 8:
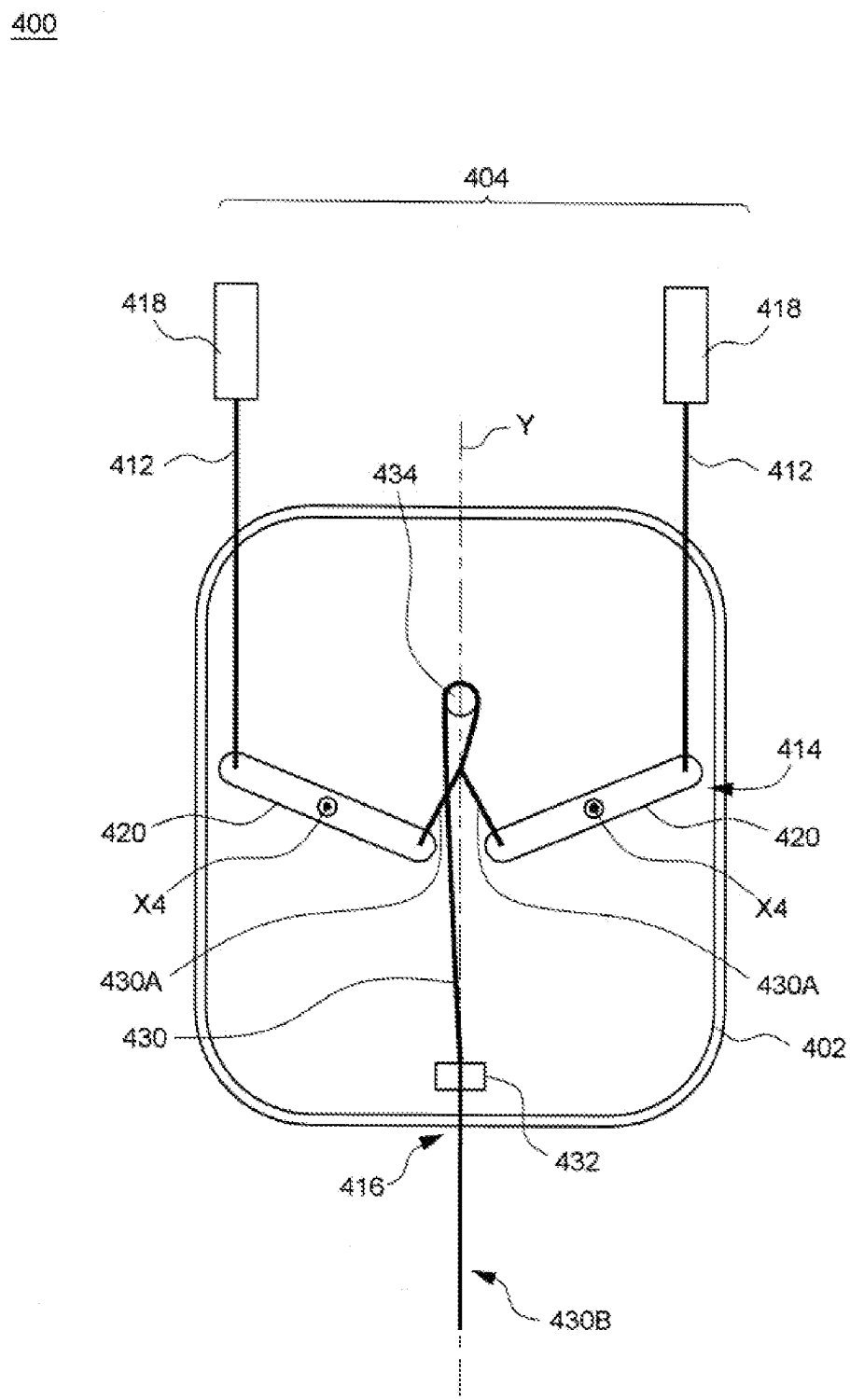
FIGS. 8 and 9 are schematic views illustrating another child seat.
Figure 9:
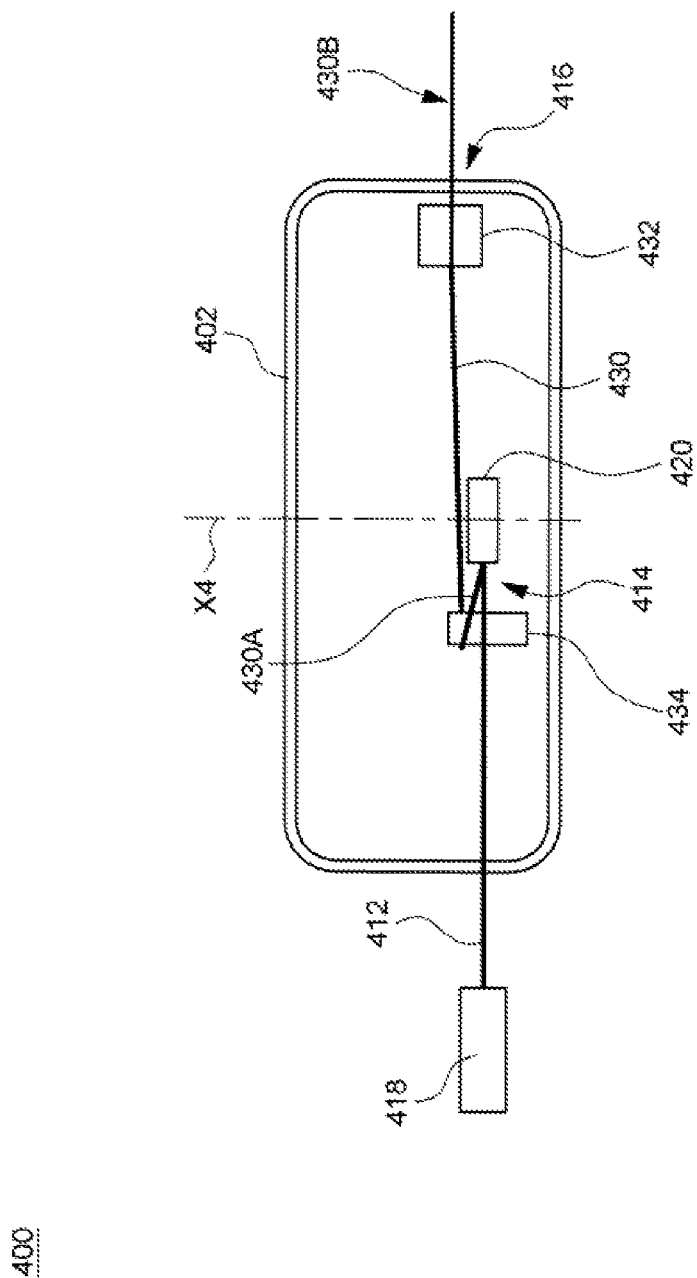

FIGS. 8 and 9 are schematic views illustrating another child seat 400. The child seat 400 can include a seat shell 402, and a restraint system 404 operable to attach the child seat 400 with an anchor structure provided in a vehicle. The restraint system 404 can include two anchor strap portions 412, a retractor assembly 414 including two levers 420, and an adjustment part 416.

Each of the anchor strap portions 412 can be respectively made of a distinct and separate continuous web material.

Each anchor strap portion 412 can have a first end portion connected with a fastener 418, and a second end portion connected with one associated lever 420.

The two levers 420 can be respectively disposed symmetrical at left and right sides of a central longitudinal axis Y of the seat shell 402. The levers 420 can be pivotally assembled with the seat shell 402 about pivot axes X4 that are parallel to each other and extend along a vertical direction relative to the seat shell 402 (i.e., from a lower surface to an upper surface of the seat shell 402). Each lever 412 can have a first end portion attached with one associated anchor strap portion 412, and an opposite second end portion operatively connected with the adjustment part 416. The levers 420 can rotate concurrently about the pivot axes X4 when the anchor strap portions 412 are respectively retracted toward the interior of the seat shell 402 or extended from the rear of the seat shell 402.

The adjustment part 416 can be operable to actuate the retractor assembly 414 in a direction that retracts the anchor strap portions 412 toward an interior of the seat shell 402. In one embodiment, the adjustment part 416 can include an adjustment strap 430, a lock 432 and a guiding structure 434. The adjustment strap 430 can be made from a web material distinct and separate from the anchor strap portions 412. The lock 432 can be disposed near a front of the seat shell 402. The guiding structure 434 can be disposed in the seat shell 402 behind the pivot axes X4 of the levers 420, and adjacent to the central longitudinal axis Y. A post, pulley or like element can be exemplary used to make the guiding structure 434. The adjustment strap 430 can pass through the lock 432, extend rearward and wrap around the guiding structure 434, and then extend forward and form two divergent portions 430A that are respectively connected with the levers 420. A second end portion 430B of the adjustment strap 430 can extend outward at the front of the seat shell 402 for actuation. The adjustment strap 430 can be operable to drive rotation of the levers 420 in opposite directions so as to retract the anchor strap portions 412 toward the interior of the seat shell 402.

When the child seat 400 is to be installed on a vehicle seat, the lock 432 can be turned to a release state to unclamp the adjustment strap 430. The anchor strap portions 412 then can be pulled outward to increase the length of the anchor strap portions 412 at the rear of the seat shell 402. Once the fasteners 418 are attached with the anchor structure of the vehicle, the adjustment strap 430 can be pulled to drive concurrent rotation of the levers 420 about the pivot axes X4 in opposite directions for retracting and tensioning the anchor strap portions 412. After the anchor strap portions 412 are suitably tensioned, the lock 432 can be turned to a locking state to clamp and prevent sliding of the adjustment strap 430 through the lock 432.

For removing the child seat 400 from the vehicle seat, the lock 432 can be turned to the release state, and the seat shell 402 can be pulled away from the anchor structure of the vehicle. As a result, the levers 420 can rotate reversely relative to the seat shell 402 in a concurrent manner, and the length of the anchor strap portions 412 can be increased at the rear of the seat shell 402 to facilitate disengagement of the fasteners 418 from the anchor structure of the vehicle.

Figure 10:
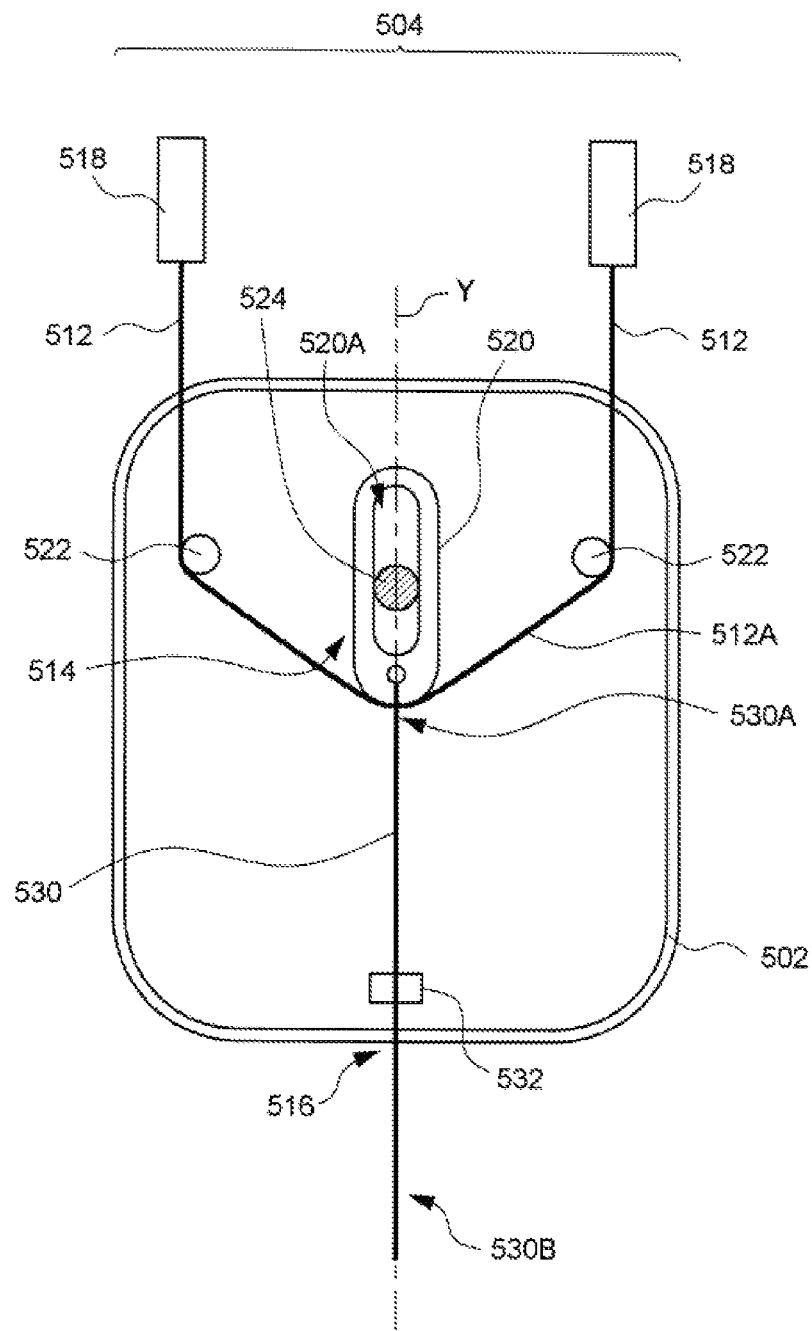
FIGS. 10 and 11 are schematic planar and side views illustrating another variant embodiment of a child seat.
Figure 11:
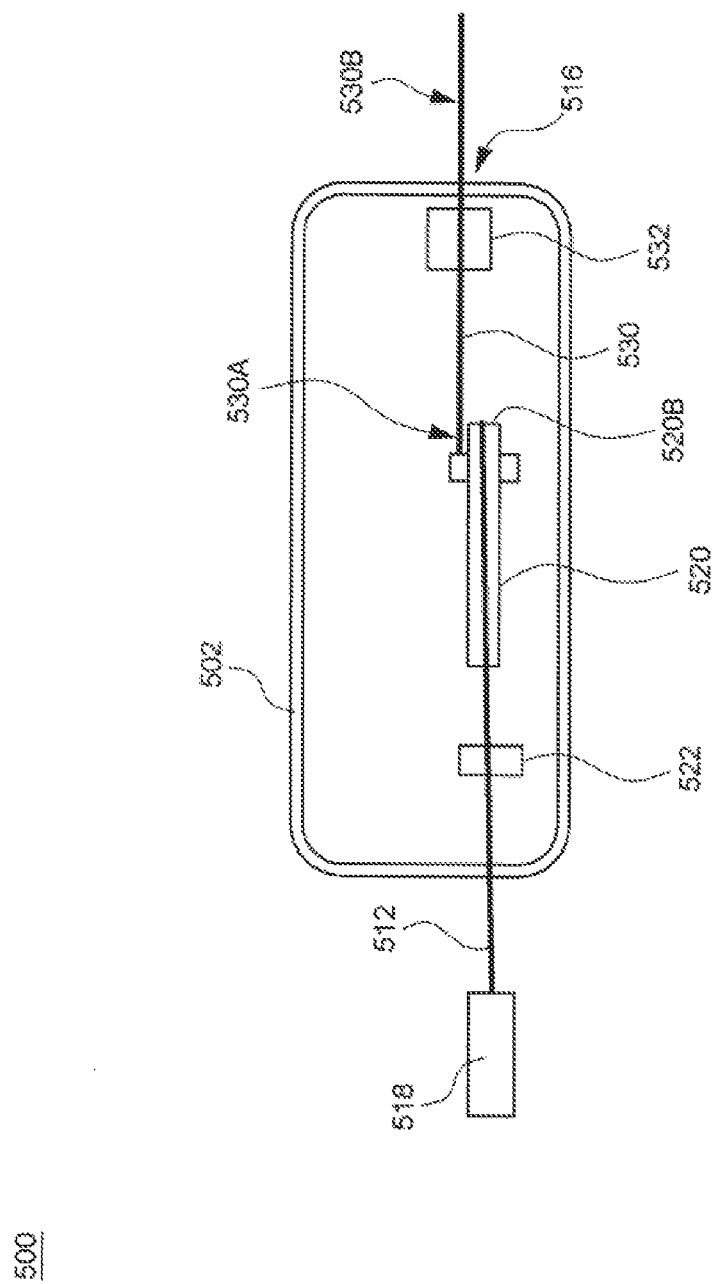

FIGS. 10 and 11 are schematic planar and side views illustrating another child seat 500. The child seat 500 can include a seat shell 502, and a restraint system 504 operable to attach the child seat 500 with an anchor structure provided in a vehicle. The restraint system 504 can include two anchor strap portions 512, a retractor assembly 514 and an adjustment part 516.

In one embodiment, a single continuous web material 512A may be used to define the two anchor strap portions 512 that extend from the rear of the seat shell 502 and are provided with fasteners 518 adapted to attach with an anchor structure of a vehicle. The web material 512A can also have a central portion that extend along a transversal direction of the seat shell 502 and is operatively connected with the retractor assembly 514.

The retractor assembly 514 can include a sliding part 520 that is movably assembled with the seat shell 502. The sliding part 520 can be disposed adjacent to a central longitudinal axis Y of the seat shell 502, and between two guiding structures 522. Posts, pulleys or like elements can be exemplary used for the guiding structures 522. The sliding part 520 can include an elongated slot 520A along which passes a post 524 affixed with the seat shell 502. A portion of the web material 512A can wrap around the guiding structures 522, extend transversally, and rest in contact with a front surface 520B of the sliding part 520. Accordingly, the sliding part 520 can slide along the central longitudinal axis Y relative to the seat shell 502 when the anchor strap portions 512 are retracted toward the interior of the seat shell 502 or extended from the rear of the seat shell 502.

The adjustment part 516 can be operable to actuate the retractor assembly 514 in a direction that retracts the anchor strap portions 512 toward an interior of the seat shell 502. Like previously described, the adjustment part 516 can include an adjustment strap 530 and a lock 532. The adjustment strap 530 can be made from a web material distinct and separate from the anchor strap portions 512. The lock 532 can be disposed near a front of the seat shell 502. The adjustment strap 530 can pass through the lock 532, have a first end 530A affixed with the sliding part 520, and a second end portion 530B extending outward at the front of the seat shell 502. The adjustment strap 530 can be operable to drive movement of the sliding part 520 along the central longitudinal axis Y toward the front of the seat shell 502 so as to retract the anchor strap portions 512 toward the interior of the seat shell 502.

While the anchor strap portions 512 have been described as being defined from a same continuous web material, it is worth noting that alternate embodiments may also have the anchor strap portions 512 formed from two separate web materials. In this case, the two web materials can respectively wrap around the guiding structures 522, have first ends respectively connected with the sliding part 520, and second end portions extending rearward and connected with the fasteners 518 as previously described. Like previously described, the sliding part 520 can move along the central longitudinal axis Y concurrent to the adjustment of the two web materials that form the anchor strap portions 512.

When the child seat 500 is to be installed on a vehicle seat, the lock 532 can be turned to a release state to unclamp the adjustment strap 530. The anchor strap portions 512 then can be pulled outward to increase the length of the anchor strap portions 512 at the rear of the seat shell 502. Once the fasteners 518 are attached with the anchor structure of the vehicle, the adjustment strap 530 can be pulled to drive the sliding part 520 to move along the axis Y toward the front of the seat shell 502 for retracting and tensioning the anchor strap portions 512. After the anchor strap portions 512 are suitably tensioned, the lock 532 can be turned to a locking state to clamp and prevent sliding of the adjustment strap 530 through the lock 532.

For removing the child seat 500 from the vehicle seat, the lock 532 can be turned to the release state, and the seat shell 502 can be pulled away from the anchor structure of the vehicle. As a result, the sliding part 520 can move along the axis Y toward the rear of the seat shell 502, and the length of the anchor strap portions 512 can be increased at the rear of the seat shell 502 to facilitate disengagement of the fasteners 518 from the anchor structure of the vehicle.

At least one advantage of the child seats described herein is the ability to provide an internal restraint system that is simple in construction and easy to operate. The restraint system includes two anchor strap portions that can be connected with an internal retractor assembly, which in turn is connected with an adjustment strap. The adjustment strap can be operable to actuate the retractor assembly for retracting the anchor strap portions in a concurrent manner. The length adjustment of the anchor strap portion at each side of the seat shell can be thereby facilitated.

Realizations of the child seats have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the inventions as defined in the claims that follow.

What is claimed is:

1. A child seat comprising:
   a seat shell;
   a retractor assembly connected with the seat shell, the retractor assembly including a spool assembled with the seat shell;
   two anchor strap portions extending outward at a rear of the seat shell and provided with two fasteners operable to attach with an anchor structure of a vehicle, at least one of the anchor strap portions being connected with the spool of the retractor assembly; and
   an adjustment part connected with the retractor assembly and accessible from outside the seat shell, wherein the adjustment part includes an adjustment strap separate from the anchor strap portions that extends outside the seat shell for operation, the adjustment strap having an end portion connected with the spool, the adjustment strap being pulled away from the seat shell to drive a displacement of the spool that retracts the at least one of the anchor strap portions toward the seat shell, and pulling the at least one of the anchor strap portions away from the seat shell draws the adjustment strap toward the seat shell, the at least one of the anchor strap portions being thereby coupled in movement to the adjustment strap, wherein the spool is rotatable to wind and unwind at least partially the adjustment strap and the at least one of the anchor strap portions, more of the adjustment strap becoming wrapped around the spool when the spool rotates for unwinding at least partially the at least one of the anchor strap portions.

2. The child seat according to claim 1, wherein the spool rotates about a pivot axis that extends transversal relative to the seat shell.

3. The child seat according to claim 2, wherein the adjustment strap is connected with the spool at a location between the respective connections of the two anchor strap portions with the spool, the adjustment strap being operable to drive a rotation of the spool for winding at least partially the two anchor strap portions.

4. The child seat according to claim 1, wherein the spool rotates about a pivot axis that extends along a vertical direction relative to the seat shell.

5. The child seat according to claim 1, wherein the adjustment part further includes a lock, the lock is spaced apart from the retractor assembly, the adjustment strap passing through the lock and extending outside the seat shell, the lock when in a locking state blocks a sliding movement of the adjustment strap through the lock, and the lock when in an unlocking state allows sliding of the adjustment strap through the lock.

6. A child seat comprising:
a seat shell;
a retractor assembly connected with the seat shell, the retractor assembly including a rotary member;
an anchor strap portion extending outward at a rear of the seat shell and provided with a fastener operable to attach with an anchor structure of a vehicle, the anchor strap portion being connected with the rotary member of the retractor assembly; and
an adjustment strap extending outside the seat shell and having an end portion connected with the rotary member, the adjustment strap being pulled away from the seat shell to apply a force on the rotary member that drives a rotation of the rotary member in a first direction for retracting the anchor strap portion toward the seat shell, and pulling the anchor strap portion away from the seat shell causes a rotation of the rotary member in a second direction opposite to the first direction that retracts the adjustment strap toward the seat shell, the anchor strap portion being thereby coupled in movement to the adjustment strap, wherein the rotary member is rotatable to wind and unwind at least partially the adjustment strap and the anchor strap portion, more of the adjustment strap becoming wrapped around the rotary member when the rotary member rotates for unwinding at least partially the anchor strap portion.

7. The child seat according to claim 6, further including a lock assembled with the adjustment strap, the lock when in a locking state blocks a sliding movement of the adjustment strap through the lock, and the lock when in an unlocking state allows sliding of the adjustment strap through the lock.

8. The child seat according to claim 6, wherein the adjustment strap extends at a side other than the rear of the seat shell.

9. The child seat according to claim 6, wherein the rotation of the rotary member driven by pulling the adjustment strap causes the anchor strap portion to wrap at least partially around the rotary member.

* * * * *